United States Patent
Wang et al.

(10) Patent No.: US 11,734,600 B2
(45) Date of Patent: Aug. 22, 2023

(54) CONTRASTIVE SEQUENCE-TO-SEQUENCE DATA SELECTOR

(71) Applicant: Google LLC, Mountain View, CA (US)

(72) Inventors: Wei Wang, Sunnyvale, CA (US); Bowen Liang, Mountain View, CA (US); Macduff Hughes, Los Gatos, CA (US); Taro Watanabe, Mountain View, CA (US); Tetsuji Nakagawa, Tokyo (JP); Alexander Rudnick, Mountain View, CA (US)

(73) Assignee: Google LLC, Mountain View, CA (US)

( * ) Notice: Subject to any disclaimer, the term of this patent is extended or adjusted under 35 U.S.C. 154(b) by 566 days.

(21) Appl. No.: 16/376,254

(22) Filed: Apr. 5, 2019

(65) Prior Publication Data

US 2019/0347570 A1   Nov. 14, 2019

Related U.S. Application Data

(60) Provisional application No. 62/668,650, filed on May 8, 2018.

(51) Int. Cl.
*G06N 20/00* (2019.01)
*G06N 7/01* (2023.01)
*H04L 67/10* (2022.01)

(52) U.S. Cl.
CPC ............... *G06N 20/00* (2019.01); *G06N 7/01* (2023.01); *H04L 67/10* (2013.01)

(58) Field of Classification Search
CPC .......... G06N 20/00; G06N 7/005; G06N 3/08; G06N 7/01; H04L 67/10
See application file for complete search history.

(56) References Cited

U.S. PATENT DOCUMENTS

| | | | |
|---|---|---|---|
| 5,768,603 A | 6/1998 | Brown et al. | |
| 8,122,026 B1* | 2/2012 | Laroco, Jr. | G06N 20/00 707/737 |
| 8,538,946 B1 | 9/2013 | Thakur et al. | |
| 10,885,900 B2* | 1/2021 | Li | G10L 15/063 |
| 2003/0009322 A1 | 1/2003 | Marcu | |
| 2006/0206308 A1 | 9/2006 | Moore | |

(Continued)

FOREIGN PATENT DOCUMENTS

WO    2009120449 A1    10/2009

OTHER PUBLICATIONS

Van Der Wees et al., "Dynamic Data Selection for Neural Machine Translation", Aug. 2017 (Year: 2017).*

(Continued)

*Primary Examiner* — Michael J Huntley
*Assistant Examiner* — Oluwatosin O Alabi
(74) *Attorney, Agent, or Firm* — Honigman LLP; Brett A. Krueger

(57) ABSTRACT

A method includes generating a base model by training with a first dataset of data pairs and generating an adapted model by training the base model on a second dataset of data pairs. The method also includes determining a contrastive score for each data pair of a third dataset of data pairs using the base model and the adapted model. The contrastive score is indicative of a probability of quality of the respective data pair. The method also includes training a target model using the data pairs of the third dataset and the contrastive scores.

24 Claims, 12 Drawing Sheets

(56) References Cited

U.S. PATENT DOCUMENTS

| | | | |
|---|---|---|---|
| 2008/0162111 A1 | 7/2008 | Bangalore et al. | |
| 2008/0306725 A1 | 12/2008 | Moore | |
| 2009/0112573 A1 | 4/2009 | He | |
| 2009/0164206 A1 | 6/2009 | Zhanyi et al. | |
| 2016/0078339 A1* | 3/2016 | Li | G09B 5/00 706/20 |
| 2016/0328644 A1* | 11/2016 | Lin | G06N 3/084 |
| 2017/0169015 A1 | 6/2017 | Huang | |
| 2018/0150609 A1* | 5/2018 | Kim | G06N 3/04 |
| 2019/0188584 A1* | 6/2019 | Rao | G05B 19/4184 |

OTHER PUBLICATIONS

Mandal et al., "Efficient Data Selection for Machine Translation", 2008 (Year: 2008).*

Akiba et al., "Using Language and Translation Models to Select the Best among Outputs from multiple MT Systems", 2002, Proceedings of the 19th international conference on Computational linguistics—vol. 1 (Year: 2002).*

Marlies Van Der Wees et al : "Dynamic Data Selection for Neural Machine Translati on", a rxiv .org,Cornell University Library, 201 Olin Library Cornell University Ithaca, Ny 14853, Aug. 2, 2017 (Aug. 2, 2017), XP080951039, abstract; Sections 1-4.

Mandala et al : "Efficient data selection for machine translation", Spoken Language Technology Workshop, 2008. SLT 2008. IEEE, IEEE, Piscataway, NJ' USA, Dec. 15, 2008 (Dec. 15, 2008), pp. 261-264, XP031421141,ISBN: 978-1-4244-3471-8 abstract; Sections 1, 4, and 5.

Eetemadi Sauleh et al : "Survey of data-selection methods in statistical machine translation", Machine Translation, Kluwer Academic Publishers, Dordrecht, N L, vol. 29, No. 3, Dec. 28, 2015 (Dec. 28, 2015), pp. 189-223, XP035904739, ISSN: 0922-6567, DOI: 10.1007/SI0590-015-9176-I [retrieved on Dec. 28, 2015] abstract; Sections 8 and 9.

International Search Report and Written Opinion of PCT/US2019/026003 dated Jul. 22, 2019.

* cited by examiner

CONTRASTIVE SEQUENCE-TO-SEQUENCE DATA SELECTOR

CROSS REFERENCE TO RELATED APPLICATIONS

This U.S. patent application claims priority under 35 U.S.C. § 119(e) to U.S. Provisional Application 62/668,650, filed on May 8, 2018. The disclosure of this prior application is considered part of the disclosure of this application and is hereby incorporated by reference in its entirety.

TECHNICAL FIELD

This disclosure relates to contrastive sequence-to-sequence data selectors for training neural translation models on noisy data.

BACKGROUND

A neural translation model learns to distribute probability mass over translations. A model trainer typically trains the model with parallel data such that more plausible translations get higher probabilities than less plausible ones. When trained on very noisy parallel data, the learned distribution is inaccurate, which then produces less precise translations.

However, large-scaled high-quality data that is clean and matching the test domain is rare. Automatic data miners typically produce parallel data and a sentence aligner processes the parallel data. The processing of the parallel data may introduce severe noise to the parallel data. Typically, trainers address this issue as a classification problem, by training a convolutional network to classify good data or bad data, with a small amount of clean data (or in-domain data). The trainer then uses the selected data to train a system having a different architecture from the selector. Thus, what the selector identifies as good data may not necessarily be good data for the final model.

SUMMARY

One aspect of the disclosure provides a method for training target models. The method includes generating, by data processing hardware, a base model by training with a first dataset of data pairs, and generating, by the data processing hardware, an adapted model by training the base model on a second dataset of data pairs. The method also includes determining, by the data processing hardware, a contrastive score for each data pair of a third dataset of data pairs using the base model and the adapted model. The contrastive score is indicative of a probability of quality of the respective data pair. The method also includes training, by the data processing hardware, a target model using data pairs of the third dataset and the contrastive scores.

Implementations of the disclosure may include one or more of the following optional features. In some implementations, training the target model further includes using data pairs of the third dataset that satisfies a threshold contrastive score. In some examples, the method further includes: determining, by the data processing hardware, that the target model is a same size as the base model; replacing, by the data processing hardware, the base model with the adapted model; replacing, by the data processing hardware, the adapted model with the target model; determining, by the data processing hardware, the contrastive score for each data pair of a fourth dataset of data pairs using the base model and the replaced adapted model; and training, by the data processing hardware, a subsequent target model using the data pairs of the fourth dataset and the contrastive scores. In other examples, the target model is larger than the base model.

The first dataset may include random data. Here, when the first dataset includes random data, the second dataset may include data this cleaner than the random data of the first dataset. Additionally or alternatively, the contrastive score may include a Kullback-Leibler (KL) divergence and/or each dataset may include sentence language pairs.

In some implementations, the method further includes sorting, by the data processing hardware, the data pairs of the third dataset based on the respective contrastive scores. In these examples, training the target model may further include generating a plurality of data batches and using each data batch to train the target model. Here, each data batch includes at least one data pair, and wherein a probability that a select data pair is included in a select data batch is based on the respective contrastive score of the select data pair, and wherein the probability increases as the respective contrastive score increases. Furthermore, in these examples, generating the plurality of data batches may include: determining a selection ratio for each data batch; determining a batch size for each data batch based on the selection ratio and a number of data pairs in the third dataset; selecting a number of data pairs from the third dataset that corresponds with the determined batch size; sorting the selected data pairs based on the respective contrastive scores; and removing, from the data batch, a removal ratio of the selected data pairs with lowest contrastive scores, the removal ration including an inverse of the selection ratio. The selection ratio may decrease over the training time. In this scenario, the batch size may be equal to a fixed batch size divided by the selection ratio.

Another aspect of the disclosure provides a system for training target models. The system includes data processing hardware and memory hardware in communication with the data processing hardware and storing instructions, that when executed by the data processing hardware, cause the data processing hardware to perform operations. These operations include generating a base model by training with a first dataset of data pairs and generating an adapted model by training the base model on a second dataset of data pairs. The operations also include determining a contrastive score for each data pair of a third dataset of data pairs using the base model and the adapted model. The contrastive score is indicative of a probability of quality of the respective data pair. The operations also include training a target model using data pairs of the third dataset and the contrastive scores.

This aspect may include one or more of the following optional features. In some implementations, training the target model further includes using data pairs of the third dataset that satisfies a threshold contrastive score. In some examples, the operations further include: determining that the target model is a same size as the base model; replacing the base model with the adapted model; replacing the adapted model with the target model; determining the contrastive score for each data pair of a fourth dataset of data pairs using the base model and the replaced adapted model; and training a subsequent target model using the data pairs of the fourth dataset and the contrastive scores. In other examples, the target model is larger than the base model.

The first dataset may include random data. Here, when the first dataset includes random data, the second dataset may include data this cleaner than the random data of the first dataset. Additionally or alternatively, the contrastive score may include a Kullback-Leibler (KL) divergence and/or each dataset may include sentence language pairs.

In some implementations, the operations further include sorting the data pairs of the third dataset based on the respective contrastive scores. In these examples, training the target model may further include generating a plurality of data batches and using each data batch to train the target model. Here, each data batch includes at least one data pair, and wherein a probability that a select data pair is included in a select data batch is based on the respective contrastive score of the select data pair, and wherein the probability increases as the respective contrastive score increases. Furthermore, in these examples, generating the plurality of data batches may include: determining a selection ratio for each data batch; determining a batch size for each data batch based on the selection ratio and a number of data pairs in the third dataset; selecting a number of data pairs from the third dataset that corresponds with the determined batch size; sorting the selected data pairs based on the respective contrastive scores; and removing, from the data batch, a removal ratio of the selected data pairs with lowest contrastive scores, the removal ration including an inverse of the selection ratio. The selection ratio may decrease over the training time. In this scenario, the batch size may be equal to a fixed batch size divided by the selection ratio.

DESCRIPTION OF DRAWINGS

Like reference symbols in the various drawings indicate like elements.

DETAILED DESCRIPTION

Implementations herein are directed toward a model trainer configured to generate a small sequence-to-sequence base model (e.g., for neural networks) by training the base model with a first dataset of noisy data pairs. Noisy data is defined as data that is not clean or parallel, or otherwise does not completely match a testing domain. Such noisy data leads to less accurate probability distributions over examples. The model trainer then generates a small sequence-to-sequence adapted model by training the base model with a second dataset of data pairs. The second dataset includes data of a higher quality than the data of the first dataset. The model trainer generates a target model by determining a contrastive score for each data pair of a third dataset, sorting the third dataset according to the contrastive score, and selecting the best-quality portion from the sorted dataset to train the target model.

Figure 1:
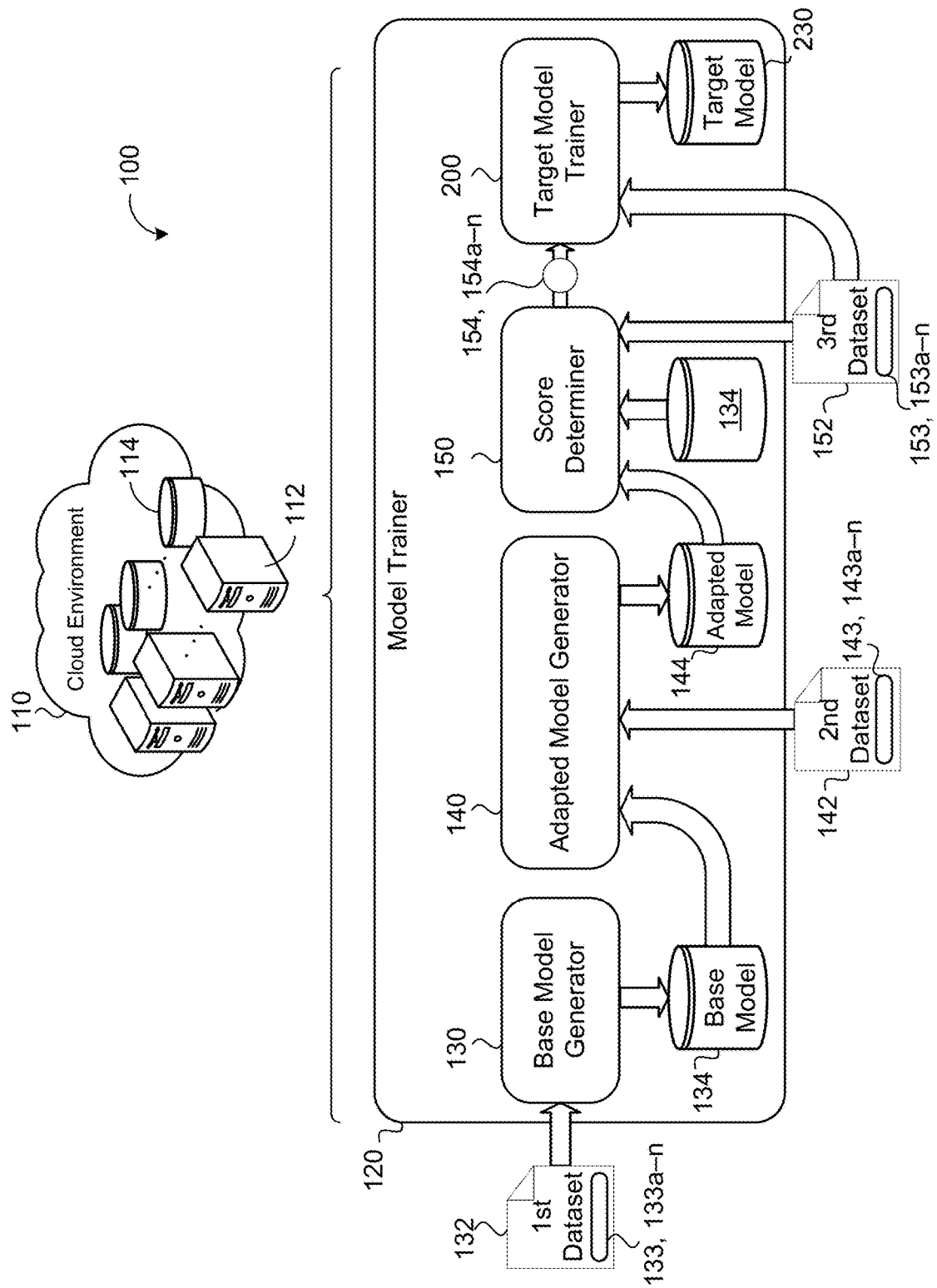
FIG. 1 is a schematic view of an example system for a contrastive sequence-to-sequence data selector.

Referring to FIG. 1, in some implementations, an example system 100 includes a computing system 110 executing a model trainer 120. The computing system 110 may correspond to a remote system or a computing device, such as a desktop workstation or laptop workstation. The remote system 110 may be a single computer, multiple computers, or a distributed system (e.g., a cloud environment) having scalable/elastic computing resources 112 (e.g., data processing hardware) and/or storage resources 114 (e.g., memory hardware).

In some examples, the data processing hardware 112 of the computing system 110 executes the model trainer 120 that includes a base model generator 130, an adapted model generator 140, a score determiner 150, and a target model trainer 200. The base model generator 130 receives a first dataset 132 of sentence data pairs 133, 133a-n for training a sequence-to-sequence base model 134 until convergence. Each sentence data pair 133 includes a first sentence in a first language and a second sentence that is a potential translation of the first sentence into a second language. The first dataset 132 typically includes random noisy data.

The adapted model generator 140 uses the sequence-to-sequence base model 134 generated by the base model generator 130 based on the first dataset 132 of sentence data pairs 133 and a second dataset 142 of sentence pairs 143, 143a-n to incrementally train a sequence-to-sequence adapted model 144. Similar to the first dataset 132, each sentence data pair 143a-n of the second dataset 142 includes a first sentence in a first language and a second sentence that is a potential translation of the first sentence into a second language. The second dataset 142 may include data that is cleaner than the random data of the first dataset 132. For example, the second dataset 142 may include a relatively small amount (in comparison to the first dataset 132) of human curated high quality data. This results in the adapted model 144 shifting probability mass from worse parallel (or noisy) data to better parallel (cleaner) data. This shifting allows for the use of contrasting information to determine a quality associated with data pairs evaluated by the base model 134 and the adapted model 144.

Typically, given a dataset S of sentence pairs, $S=\{s_0, \ldots, s_i, \ldots\}$, where $s_i$ is the i-th sentence pair, the score determiner 150 executing a data selection method usually assigns $s_i$ a score 154 with a scoring function, $f(s_i) \in R$. The score reflects a desired quality. For example, the higher the score, the cleaner (or the more matching to a domain, or more difficult for curriculum learning, or more uncertain for active learning) the data. The trainer 120 may use the score 154, for example, to produce a hard data filtering according to or satisfying a threshold contrastive score. Alternatively, the trainer 120 softly uses the score 154 for example weighting.

A selection method also defines a strategy for scheduling the data based on the scores 154. With a static selection strategy, the data is selected offline and used in a random order during training. On the other hand, a dynamic selection strategy tries to schedule the data in an order based on the scoring function during in-progress training. The static version is a specific implementation of the dynamic selection. The dynamic scheduling by the dynamic selection strategy yields a dynamic example sampling effect that may implement example weighting.

Still referring to FIG. 1, the score determiner 150 is configured to receive a third dataset 152 with sentence pairs 153, 153a-n, the sequence-to-sequence base model 134, and the sequence-to-sequence adapted model 144 for determining a respective contrastive score 154, 154a-n of each sentence pair 153 within the third dataset 152. Each contrasting score 154 is indicative of a probability of quality or cleanness associated with the respective data pair 153. Optionally, the contrastive score 154 includes a Kullback-Leibler (KL) divergence. The KL Divergence (also called relative entropy) is a measure of how one probability distribution diverges from a second, expected probability distribution. Specifically, the KL Divergence between the adapted model 144, $p(S_i)=p(t_i/s_i)$ and the base model 134, $q(S_i)=q(t_i|s_i)$ may be used to determine a contrastive score 154 (or quality measure) of a sentence pair $S_i=(s_i, t_i)$ as follows:

$$f(S_i) = D_{KL}(p(S_i) \| q(S_i)) \qquad (1)$$
$$= -p(S_i)\log\left(\frac{q(S_i)}{p(S_i)}\right)$$
$$= -p(S_i)[\log(q(S_i)) - \log(p(S_i))]$$

Because distribution p is a cleaner model, the distribution p shifts probability mass from worse data to better data. Therefore, if $p(S_i)$ is larger than $q(S_i)$, $S_i$ likely offers good information gain. However, even with the information gain, $S_i$ may still be a rare example or usage and $p(S_i)$ is used to determine this case. Because the score determiner 150 uses the probability between the sequence-to-sequence base and adaptive models 134, 144, a separate metric for data quality or cleanness or domains is not required. Because data quality involves probability mass distribution, good quality data (e.g., clean or matching data) allows the model to produce a more accurate distribution. Therefore, equation (1) may represent a unified metric for data quality.

As discussed in more detail below, the target model trainer 200 receives and uses the contrastive scores 154 and the third dataset 152 to train a target model 230. In some examples, the target model trainer 200 sorts the data pairs 153 of the third dataset 152 based on the respective contrastive scores 154. Based on the correlation between training time and resulting model size, the target model 230 may be larger than both the adapted model 144 and the base model 134. Therefore, generating a small base model 134 and an equally small adapted model 144 will significantly reduce computational overhead and train considerably faster than the larger target model 230, allowing for substantial time savings. Optimally, the base model 134 and adapted model 144 share a similar architecture with the target model 230 (e.g., sequence-to-sequence), as a similarity between the models 134, 144, 230 would enable the selector (the base model 134 and adapted model 144) to select the optimal sentence pairs for the target model 230.

Figure 2:
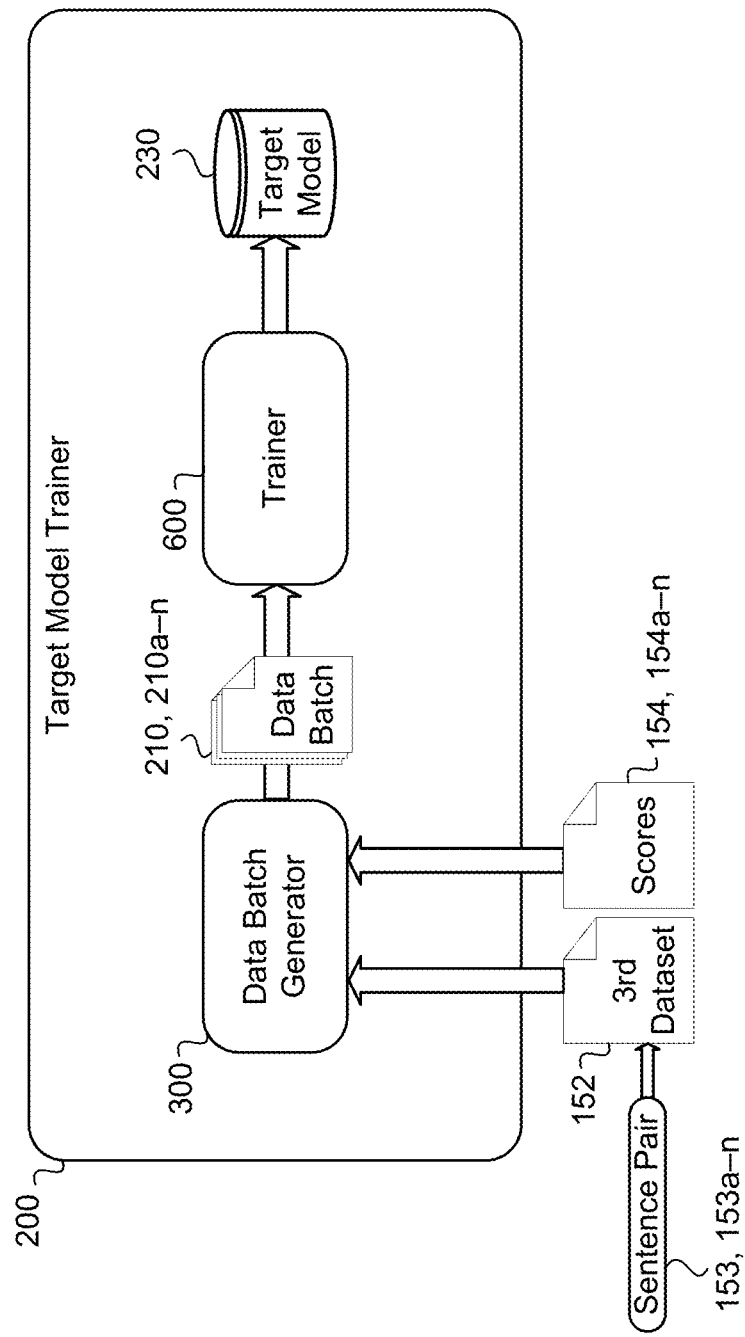
FIG. 2 is a schematic view of example components of a target model trainer of FIG. 1.

Referring now to FIG. 2, in some implementations, the target model trainer 200 includes a data batch generator 300 that generates data batches 210, 210a-n of sentence pairs 153 using the third dataset 152 and the contrastive scores 154. That is, the data batch 210 is a subset of the sentence pairs 153 of the third dataset 152. The data batch generator 300 generates a plurality of data batches 210, each with a different number and subset of data pairs 153. The contrastive score 154 of a select sentence pair 153 determines a probability that the data pair 153 is included in a select data batch 210. For example, an increased contrastive score 154 may reflect a correspondingly increased probability of inclusion of a data pair 153 in a data batch 210. A trainer 600 trains the target model 230 using the data batches 210.

The contrastive scores 154 may be used to rank sentence pairs 153 to select from and use the static top x % of data to train the target model 230 and discard the 1-x % of sentence pairs 153. However, such a static, offline selection has problems when the training data is small, as discarding some (e.g., 1-x %) of the entire data means reducing the training data size. Further, when the training data is mostly of lower quality (e.g., non-parallel, or most out of domain), a smaller x % such that the selected data is of good enough quality is beneficial. In both cases, the selected training data may not be enough to train the target model 230, but a bigger x % would make the selected training data noisy again, compromising the effect of data selection.

A dynamic data scheduling approach allows the model trainer 120 to train the target model 230 on the entire set of data, but to also benefit from the quality of data selection. The model trainer 120 via the target model trainer 200 accomplishes this by training the target model 230 on non-selected data at the beginning, but on gradually selected, higher-quality data towards the end of the training. In other words, the dynamic data scheduling allows the target model trainer 200 to leverage different qualities of training data in increments from lower-quality training data to higher-quality training data.

Figure 3:
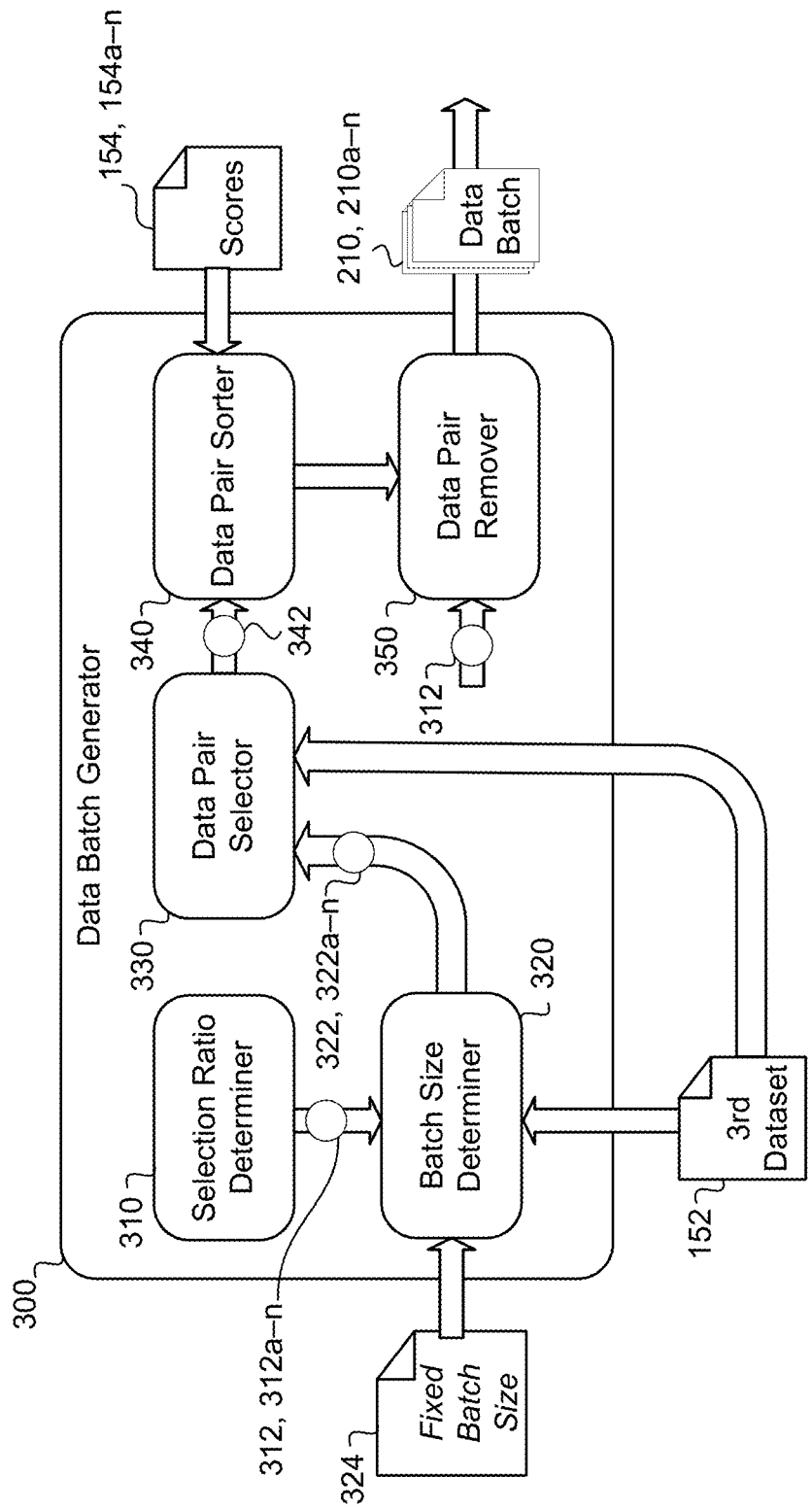
FIG. 3 is a schematic view of an example data batch generator of FIG. 2.

Typically, a model trainer uses random data to train a model with data batches of fixed batch size b (e.g., b=256). For example, for each data batch, a typical trainer may randomly select 256 data pairs from the dataset for each data batch. However, with dynamic data selection, a data batch size b(t) increases with time and data selection is used to select higher quality data in order to maintain the fixed batch size. Referring now to FIG. 3, to generate the data batches 210, the data batch generator 300 of the target model trainer 200 may include a selection ratio determiner 310 to determine a selection ratio 312, 312a-n for each data batch 210. For example, the selection ratio r(t) 312 may be defined as a function over a global step (time) as follows:

$$r(t) = \min\left(R, 0.5^{\frac{t}{T}}\right) \qquad (2)$$

Figure 4:
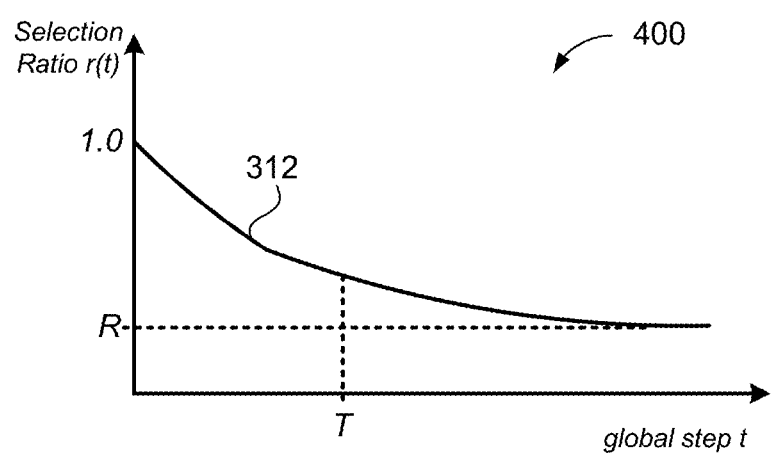
FIG. 4 is an example plot of a selection ratio decreasing over time.

With reference to FIG. 4, an example plot 400 depicts the selection r(t) 312 exponentially decreasing over time such that it halves every T steps until it reaches a determined floor value R (e.g., R=0.2). That is, the selection ratio r(t) 312 may decrease with each generated data batch 210. The determined floor value R ensures that r(t) does not become so small as to introduce selection bias. Referring back to the data batch generator 300 of FIG. 3, a batch size determiner 320 may determine a corresponding batch size 322, 322a-n for each data batch 210. The data batch size 322 may be based on the selection ratio r(t) 312 and a fixed batch size b 324. For example, the data batch size b(t) 322 may be defined as follows:

$$b(t) = \frac{b}{r(t)} \qquad (3)$$

Figure 5:
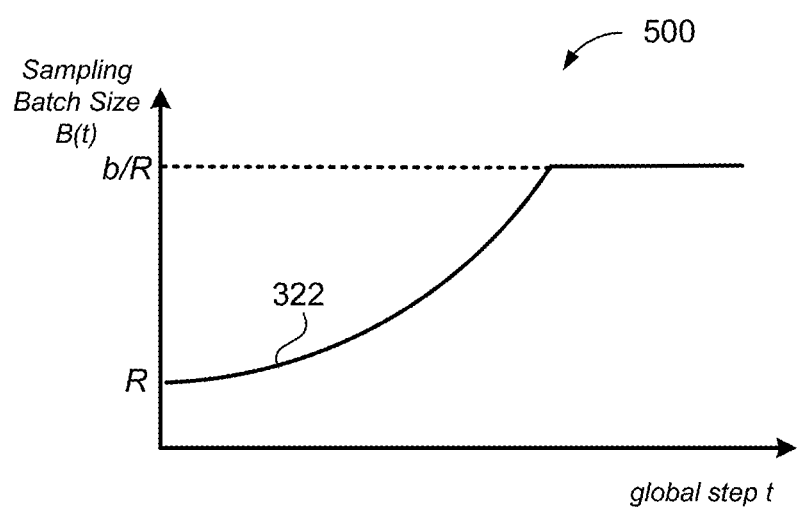
FIG. 5 is an example plot of a data batch size increasing over time.

FIG. 5 shows an example plot 500 depicting the data batch size b(t) 322 increasing as the selection ratio r(t) 312 of FIG. 4 decreases until the data batch size b(t) 322 reaches a maximum value of b/R and remains there until training completes. In this way, the selection ratio r(t) 312 (FIG. 4) may decrease over training time. Referring back to FIG. 3, after the batch size determiner 320 determines the data batch size 322, a data pair selector 330 selects a number of data pairs 342 from the third dataset 152 associated with the determined batch size b(t) 322. This selection is typically random, but other selection methods may be used. After selection, a data pair sorter 340 sorts the selected data pairs 342 based on the respective contrastive score 154 for each selected data pair. A data pair remover 350 then removes, from the data batch 210, a removal ratio of the scored and sorted data pairs with the lowest contrastive scores 154. The removal ratio is equivalent to an inverse of the selection ratio, i.e., 1−r(t). For example, when r(t)=0.5, then 50% of the selected data pairs 342 will be removed from the data batch 210 (the 50% with the lowest contrastive scores 154). In this way, the effective batch size for target model 230 training remains the same as typical training, but the data batches 210 consist of top selection ratios r(t) 312 for selected data pairs 153, and thus, increase in quality as training progress (or as t increases). For example, for b=256 and r(t)=0.5, b(t) will equal 512 of which the top (in contrastive scores) 50% (because r(t)=0.5) will be selected, for a final batch size of 256.

Figure 6:
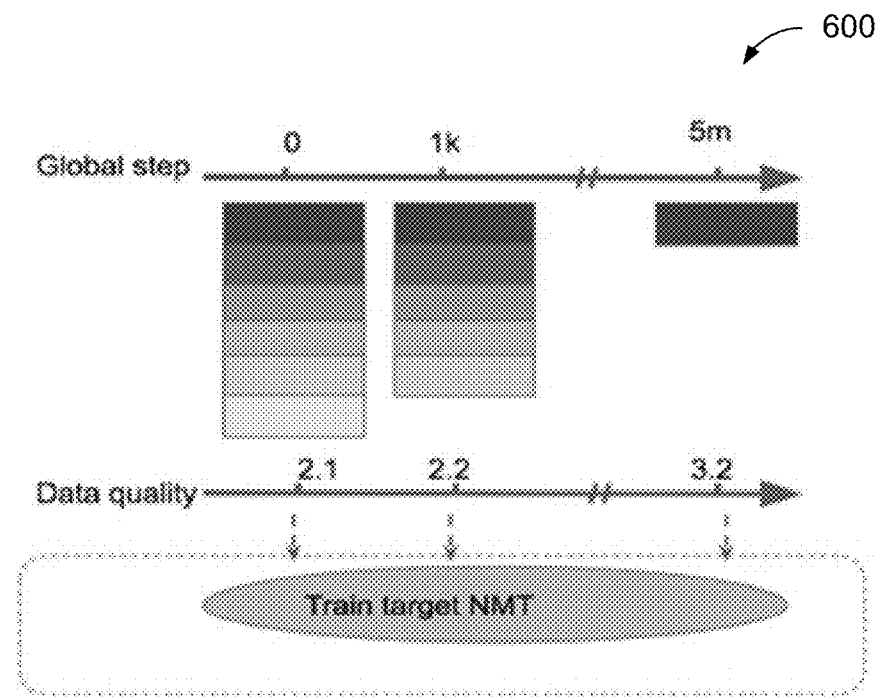
FIG. 6 is an example plot of dynamic data scheduling.

Referring now to FIG. 6, as training time t progresses, the trainer 600 of the target training model 200 receives data batches 210 with higher and higher quality (i.e., less noise and cleaner), though this is realized at per data batch as opposed to all data globally. This reflects cross-batch example weighting. Typical example weighting is within a data batch 210, such that the model trainer can assign a weight to an example according to its quality. Even though within-batch weighting down-weighs low quality examples, the selector still mixes in low quality examples, however, and pollutes the data with noise. Cross-batch example weighting up-weighs a good example by using it more frequently in different, later data batches. In the example shown, the trainer 600 selects the darkest shade (best) example three times at the three time steps, while only selecting the lightest shade (worst) example once. Low-quality examples are down-weighed by disappearing from later data batches, increasing the data quality of those batches. The target model 230 trained with data with higher quality data batches 210 in successive steps typically improves the translation quality of the target model 230.

Figure 7:
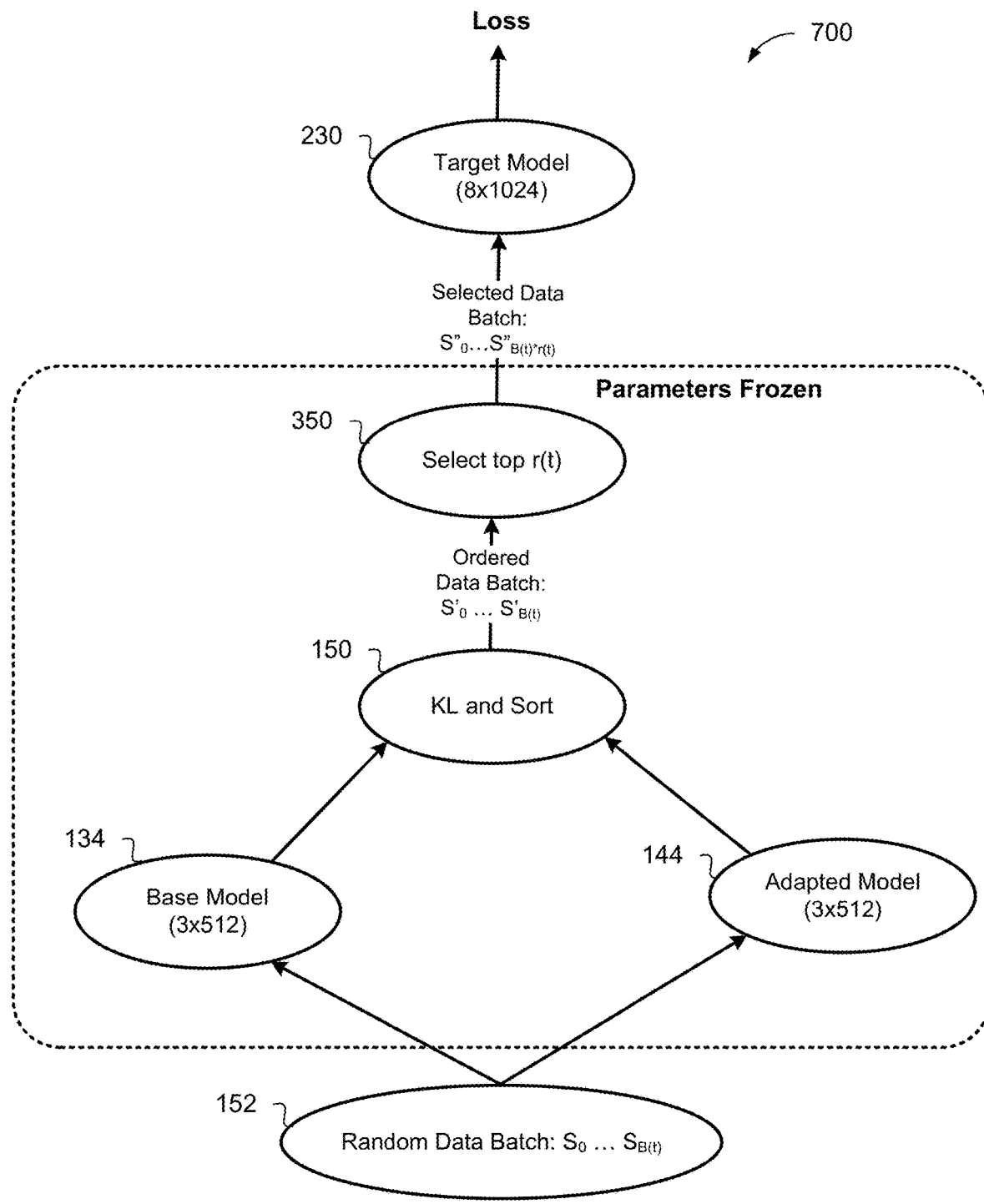
FIG. 7 is an example flow chart for training a target model using the example system of FIG. 1.

FIG. 7 illustrates a flow chart 700 for training the target model 230 with dynamic, contrastive data selection. The decision chart 700 may be described with reference to FIGS. 1-3. The score determiner 150 receives a third dataset 152 with sentence pairs 153, 153a-n, the sequence-to-sequence base model 134, and the sequence-to-sequence adapted model 144 for determining a respective contrastive score 154, 154a-n of each sentence pair 153 within the third dataset 152. Specifically, the score determiner 150 scores b(t) random examples and feeds the selected examples to the target model trainer 200 to obtain a loss. When training a neural network, loss reflects the error that the neural network creates against a best or most reliable model (e.g., the gold standard) available at a time in training. The target model trainer 200 only trains the parameters in the target model 230 with parameters of the base model 134 and adapted model 144 frozen. As previously discussed, the contrastive models can be much smaller than the target model 230 to reduce the computation overhead. Importantly, the contrastive scores 154 correlate with data quality. Here, the model trainer 120 determines a size of the target model 230 (e.g., 8×1024) is greater than a size of each of the base model 134 (e.g., 3×512) and the adapted model 144 (e.g., 3×512).

Figure 8A:
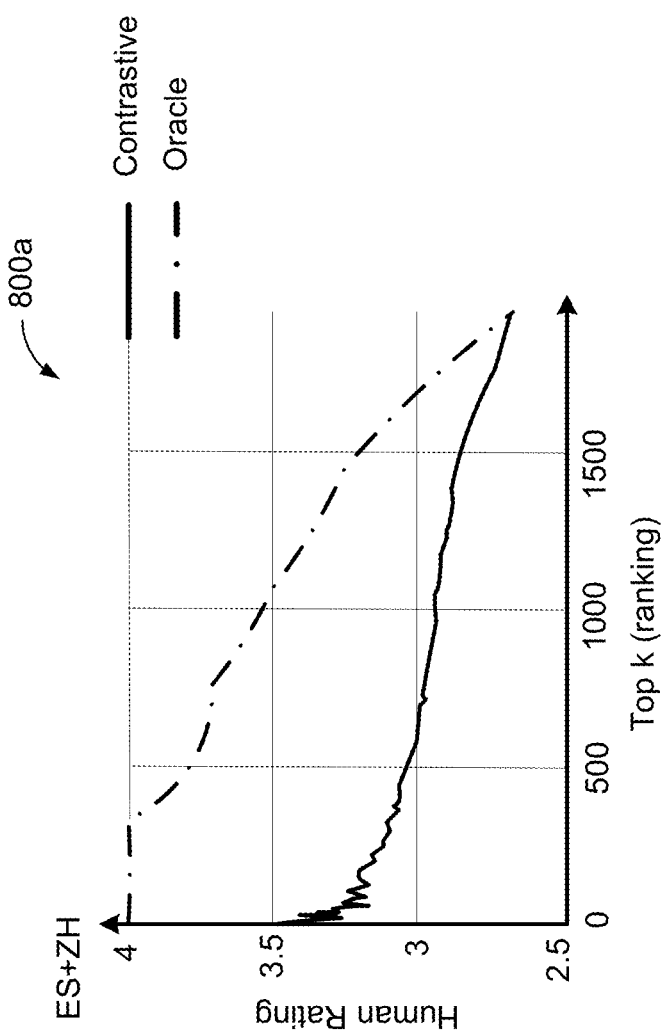
FIGS. 8A and 8B are example plots of a rating of the example system of FIG. 1 compared to human ratings.
Figure 8B:
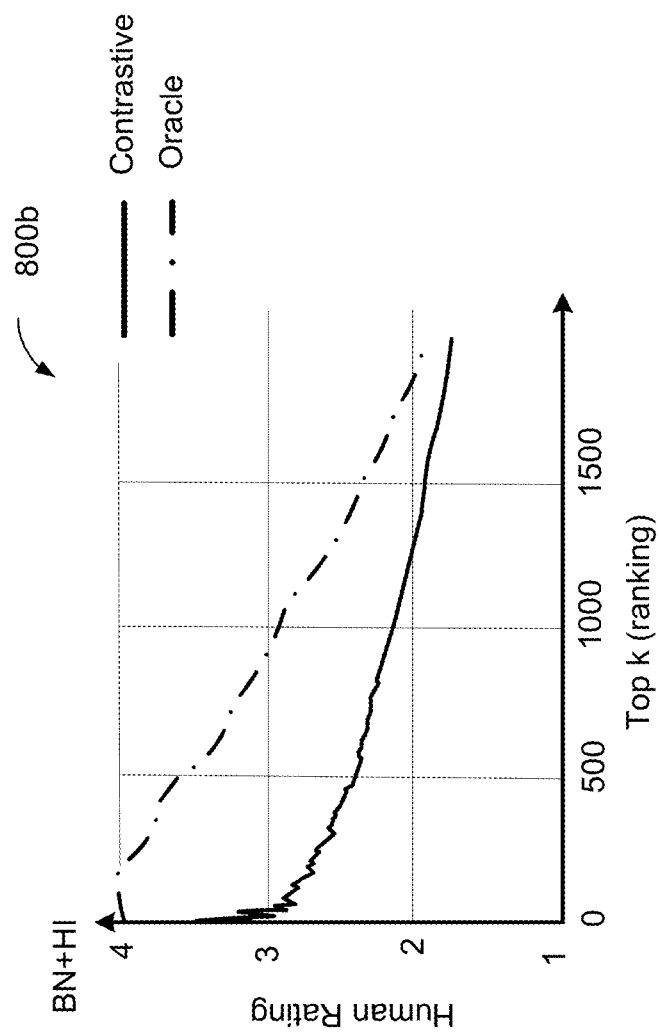

Referring now to FIGS. 8A and 8B, human cleanliness ratings for two-thousand (2,000) sentence pairs are plotted according to the respective human cleanliness rating and the associated contrastive score 154. In FIG. 8A, English to Spanish translations and English to Chinese translations are averaged and plotted against the oracle (human) ratings in plot 800a. In FIG. 8B, English to Bengali translations and English to Hindi translations are averaged and plotted against the oracle ratings in plot 800b. These plots 800a, 800b illustrate that as the contrastive score 154 decreases, data quality correspondingly decreases.

Figure 9:
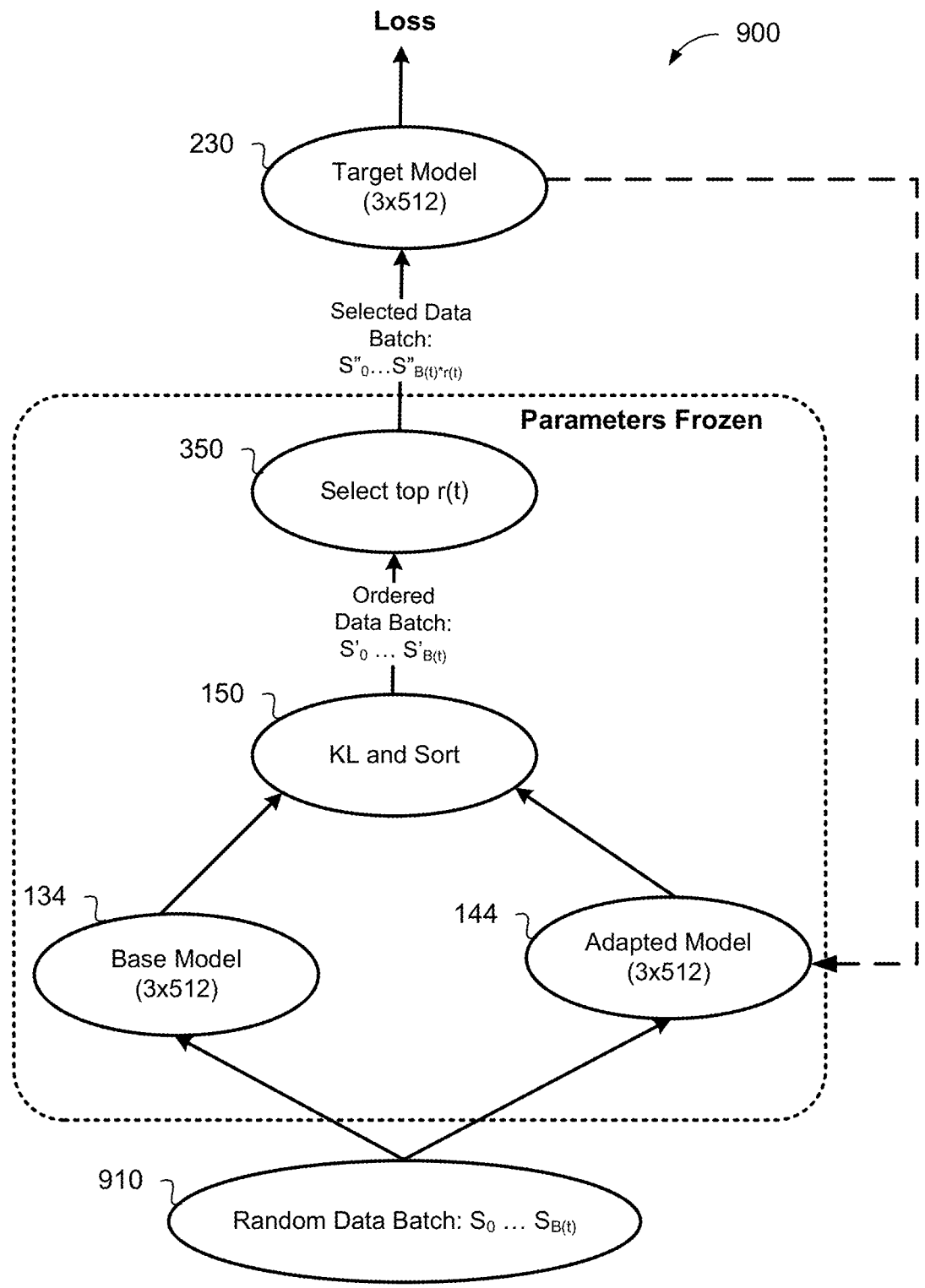
FIG. 9 is another example flow chart for training a target model using the example system of FIG. 1.

Referring now to flowchart 900 of FIG. 9, in some implementations, the model trainer 120 determines that the target model 230 is a same size as the base model 134 and the adapted model 144 (e.g., 3×512). For instance, if the target model 230 is determined to be the same size as the base and adapted models 134, 144, the model trainer 120 replaces the base model 134 with the adapted model 144 and replaces the adapted model 144 with the target model 230. The model trainer 120 then determines the contrastive score 154 for each data pair of a fourth dataset of data pairs 910 using the new base model 134 and new adapted model 144. The model trainer 120 then trains a subsequent target model 230 using data pairs of the fourth dataset 910. This process may continue indefinitely. In this way, the target model 230 may be incrementally improved. If the target model 230 is not the same size as the adapted model 144 and base model 134, the model trainer 120 may derive a modified target model from the target model 230 that is the same size as the adapted model 144 and base model 134. After the training iterations are complete, the modified target model may be used to update or regenerate the target model 230 of the original size.

Figure 10:
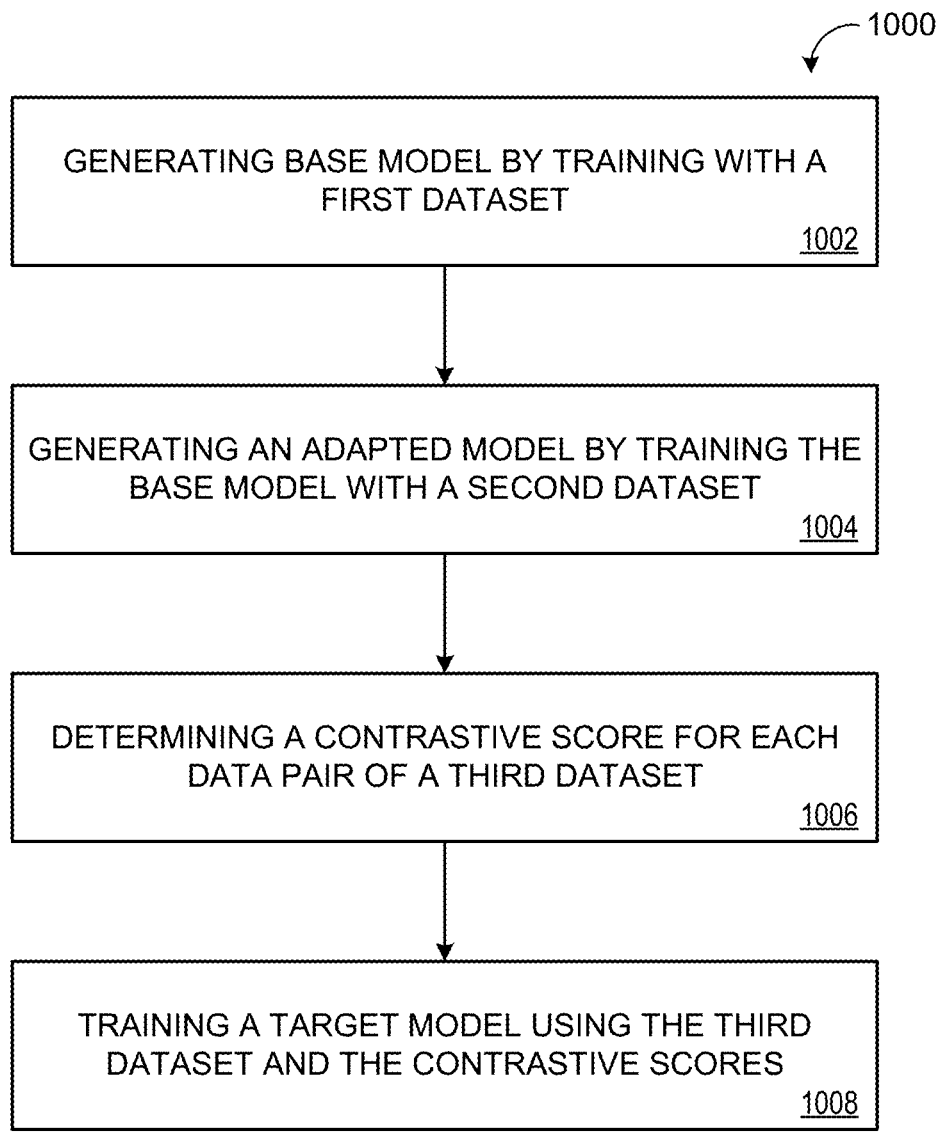
FIG. 10 is a flowchart of an example method for iteratively training a target model.

FIG. 10 is a flowchart of an example method 1000 for training a contrastive sequence-to-sequence data selector. The flowchart starts at operation 1002 by generating, at data processing hardware 112, a base model 134 by training with a first dataset 132 of data pairs 133. In some examples, the first dataset 132 includes random data. At operation 1004, the method 1000 includes generating, by the data processing hardware 112, an adapted model 144 by training the base model 134 on a second dataset 142 of data pairs 143. Optionally, the second dataset 142 may include data that is cleaner (e.g., curated by a human) than the random data of the first dataset 132. At operation 1006, the method 1000 includes determining, by the data processing hardware 112, a contrastive score 154 for each data pair 153 of a third dataset 152 of data pairs 153, 153a-n using the base model 134 and the adapted model 144. The contrastive score 154 may include KL Divergence. The method 1000, at operation 1008, also includes training, by the data processing hardware 112, a target model 230 using the data pairs 153 of the third dataset 152 and the contrastive scores 154. In some implementations, the method 1000 includes training the target model 230 using data pairs 153 of the third dataset 152 that satisfy a threshold contrastive score 154. Each dataset 132, 142, 152 may include sentence language pairs. Additionally, the target model 230 may be larger than the base model 134 and the adapted model 144.

In some examples, the method 1000 also includes sorting, by the data processing hardware 112, the data pairs 153 of the third dataset 152 based on the respective contrastive scores 154. Optionally, the method 1000 includes generating a plurality of data batches 210, where each data batch 210 includes at least one data pair 153 and where a probability that a select data pair 153a is included in a select data batch 210a is based on the respective contrastive score 154a of the select data pair 153a. The probability that the select data pair 153a is included increases as the respective contrastive score 154a increases. The method 1000 then includes training the target model 230 using each data batch 210. Generating the plurality of data batches 210 may include determining a selection ratio 312 for each data batch 210 and determining a batch size 322 for each data batch 210, where the batch size 322 is based on the selection ratio 312 and a fixed batch size 324. Further, generating the plurality of data batches 210 also includes selecting a number of data pairs 153 from the third dataset 152 that corresponds with the determined batch size 322, sorting the selected data pairs 342 based on the respective contrastive scores 154, and removing from the data batch 210, the removal ratio of the selected pairs 342 with the lowest contrastive scores 154. Optionally, the selection ratio 312 decreases over training time. The batch size 322 may be equal to the fixed batch size 324 divided by the selection ratio 312.

Alternatively, the method 1000 includes determining, by the data processing hardware 112, that the target model 230 is the same size as the base model 134 and replacing, by the data processing hardware 112, the base model 134 with the adapted model 154. When the target model 230 is the same size as the base model 134, the method 1000 further includes replacing, by the data processing hardware 112, the base model 134 with the adapted model 154 and replacing, by the data processing hardware 112, the adapted model 154 with the target model 230. The method 1000 then includes determining, by the data processing hardware 112, the contrastive score 154 for each data pair of a fourth dataset of data pairs 910 using the base model 134 and the replaced adapted model 154 and training, by the data processing hardware 112, a subsequent target model 230 using the data pairs of the fourth dataset 910 and the contrastive scores 154.

Figure 11:
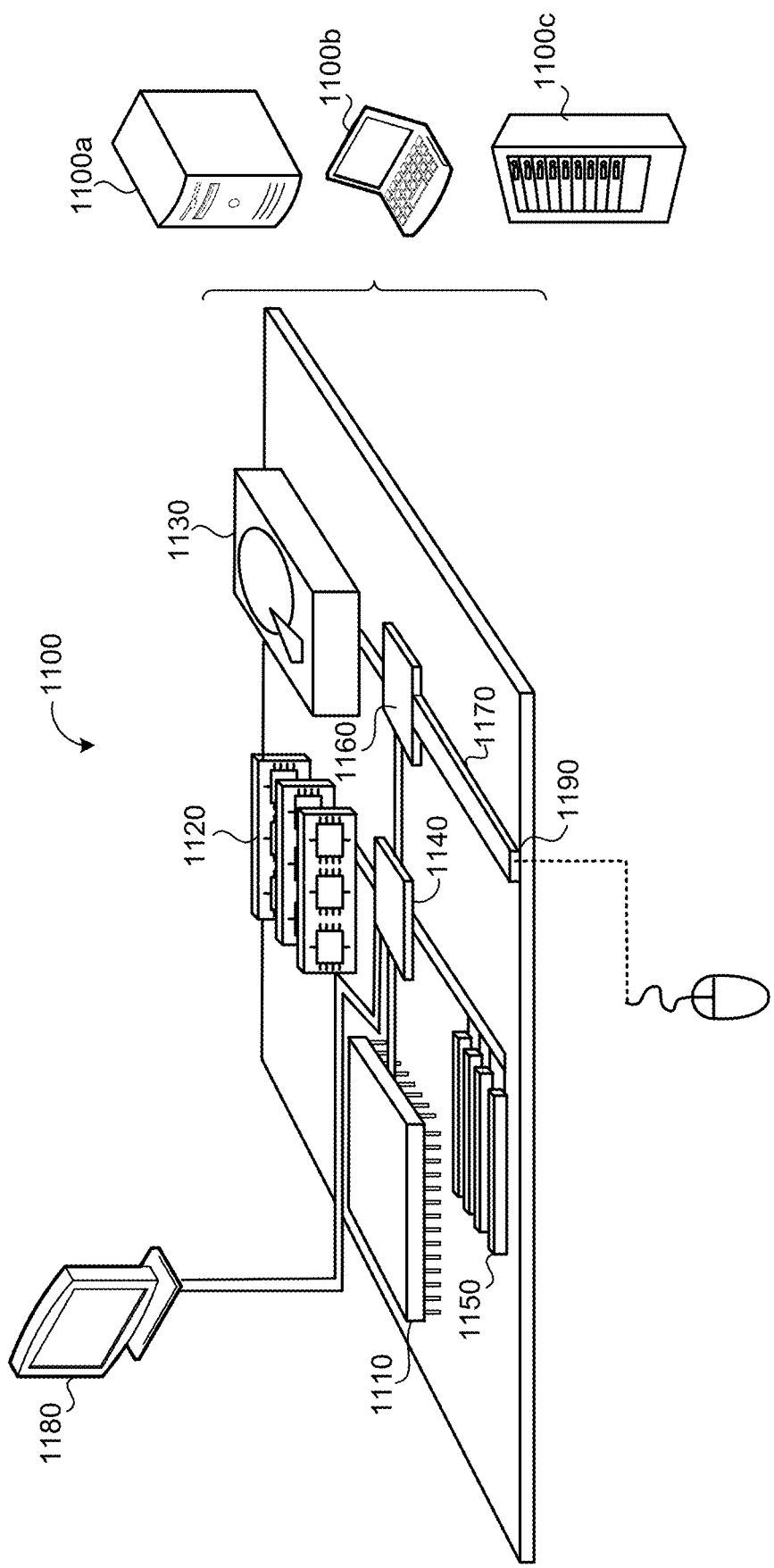
FIG. 11 is a schematic view of an example computing device that may be used to implement the systems and methods described herein.

FIG. 11 is a schematic view of an example computing device 1100 that may be used to implement the systems and methods described in this document. The computing device 1100 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1100 includes a processor 1110, memory 1120, a storage device 1130, a high-speed interface/controller 1140 connecting to the memory 1120 and high-speed expansion ports 1150, and a low speed interface/controller 1160 connecting to a low speed bus 1170 and the storage device 1130. Each of the components 1110, 1120, 1130, 1140, 1150, and 1160, are interconnected using various buses, and may be mounted on a common motherboard or in other manners as appropriate. The processor 1110 can process instructions for execution within the computing device 1100, including instructions stored in the memory 1120 or on the storage device 1130 to display graphical information for a graphical user interface (GUI) on an external input/output device, such as display 1180 coupled to high speed interface 1140. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1120 stores information non-transitorily within the computing device 1100. The memory 1120 may be a computer-readable medium, a volatile memory unit(s), or non-volatile memory unit(s). The non-transitory memory 1120 may be physical devices used to store programs (e.g., sequences of instructions) or data (e.g., program state information) on a temporary or permanent basis for use by the computing device 1100. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1130 is capable of providing mass storage for the computing device 1100. In some implementations, the storage device 1130 is a computer-readable medium. In various different implementations, the storage device 1130 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1120, the storage device 1130, or memory on processor 1110.

The high speed controller 1140 manages bandwidth-intensive operations for the computing device 1100, while the low speed controller 1160 manages lower bandwidth-intensive operations. Such allocation of duties is exemplary only. In some implementations, the high-speed controller 1140 is coupled to the memory 1120, the display 1180 (e.g., through a graphics processor or accelerator), and to the high-speed expansion ports 1150, which may accept various expansion cards (not shown). In some implementations, the low-speed controller 1160 is coupled to the storage device 1130 and a low-speed expansion port 1190. The low-speed expansion port 1190, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 500a or multiple times in a group of such servers 1100a, as a laptop computer 1100b, or as part of a rack server system 1100c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   generating, by data processing hardware, a base model by training with a first dataset of data pairs;
   generating, by the data processing hardware, an adapted model by training the base model on a second dataset of data pairs;
   for each respective data pair of a third dataset of data pairs:
      determining, by the data processing hardware, a first probability distribution for the respective data pair using the base model;
      determining, by the data processing hardware, a second probability distribution for the respective data pair using the adapted model;
      determining, by the data processing hardware, a measure of a divergence between the first probability distribution and the second probability distribution; and
      determining, by the data processing hardware, a respective contrastive score for the respective data pair using the determined measure of the divergence, the respective contrastive score indicative of a probability of quality of the respective data pair;
   sorting, by the data processing hardware, the data pairs of the third dataset based on the respective contrastive scores; and
   training, by the data processing hardware, using the sorted data pairs of the third dataset and the respective contrastive scores, a target model based on an order of the sorted data pairs of the third dataset.

2. The method of claim 1, wherein training the target model further comprises using the data pairs of the third dataset that satisfy a threshold contrastive score.

3. The method of claim 1, wherein training the target model further comprises:
   generating a plurality of data batches, wherein each data batch comprises at least one data pair and wherein a probability that a select data pair is included in a select data batch is based on the respective contrastive score of the select data pair and wherein the probability increases as the respective contrastive score increases; and
   training the target model using each data batch.

4. The method of claim 3, wherein generating the plurality of data batches comprises:
   determining a selection ratio for each data batch;
   determining a batch size for each data batch, wherein the batch size is based on the selection ratio and a number of data pairs in the third dataset;

selecting a number of data pairs from the third dataset that corresponds with the determined batch size;
sorting the selected number of data pairs based on the respective contrastive scores; and
removing, from the data batch, a removal ratio of the selected number of data pairs with lowest contrastive scores, the removal ratio comprising an inverse of the selection ratio.

5. The method of claim 4, wherein the selection ratio decreases over training time.

6. The method of claim 5, wherein the batch size is equal to a fixed batch size divided by the selection ratio.

7. The method of claim 1, wherein the target model has a first size and the base model has a second size, and wherein the first size is larger than the second size.

8. The method of claim 1, further comprising:
determining, by the data processing hardware, that a first size corresponding to the target model and a second size corresponding to the base model are the same; and
when the first size is the same as the second size:
replacing, by the data processing hardware, the base model with the adapted model;
replacing, by the data processing hardware, the adapted model with the target model;
determining, by the data processing hardware, the respective contrastive score for each data pair of a fourth dataset of data pairs using the base model and the replaced adapted model; and
training, by the data processing hardware, a subsequent target model using the data pairs of the fourth dataset and the respective contrastive scores.

9. The method of claim 1, wherein the first dataset comprises random data.

10. The method of claim 9, wherein the second dataset comprises data that is cleaner than the random data of the first dataset.

11. The method of claim 1, wherein the respective contrastive score comprises a Kullback-Leibler (KL) divergence.

12. The method of claim 1, wherein each dataset comprises sentence language pairs.

13. A system comprising:
data processing hardware; and
memory hardware in communication with the data processing hardware, the memory hardware storing instructions that when executed on the data processing hardware cause the data processing hardware to perform operations comprising:
generating a base model by training with a first dataset of data pairs;
generating an adapted model by training the base model on a second dataset of data pairs;
for each respective data pair of a third dataset of data pairs:
determining a first probability distribution for the respective data pair using the base model;
determining, by the data processing hardware, a second probability distribution for the respective data pair using the adapted model;
determining, by the data processing hardware, a measure of a divergence between the first probability distribution and the second probability distribution; and
determining a respective contrastive score for the respective data pair using the determined measure of the divergence, the respective contrastive score indicative of a probability of quality of the respective data pair;
sorting the data pairs of the third dataset based on the respective contrastive scores; and
training, using the sorted data pairs of the third dataset and the respective contrastive scores, a target model based on an order of the sorted data pairs of the third dataset.

14. The system of claim 13, wherein training the target model comprises using the data pairs of the third dataset that satisfy a threshold contrastive score.

15. The system of claim 13, wherein training the target model further comprises:
generating a plurality of data batches, wherein each data batch comprises at least one data pair and wherein a probability that a select data pair is included in a select data batch is based on the respective contrastive score of the select data pair and wherein the probability increases as the respective contrastive score increases; and
training the target model using each data batch.

16. The system of claim 15, wherein generating the plurality of data batches comprises:
determining a selection ratio for each data batch;
determining a batch size for each data batch, wherein the batch size is based on the selection ratio and a number of data pairs in the third dataset;
selecting a number of data pairs from the third dataset that corresponds with the determined batch size;
sorting the selected number of data pairs based on the respective contrastive scores; and
removing, from the data batch, a removal ratio of the selected number of data pairs with lowest contrastive scores, the removal ratio comprising an inverse of the selection ratio.

17. The system of claim 16, wherein the selection ratio decreases over training time.

18. The system of claim 17, wherein the batch size is equal to a fixed batch size divided by the selection ratio.

19. The system of claim 13, wherein the target model has a first size and the base model has a second size, and wherein the first size is larger than the second size.

20. The system of claim 13, wherein the operations further comprise:
determining that a first size corresponding to the target model and a second size corresponding to the base model are the same; and
when the first size is the same size as the second size:
replacing the base model with the adapted model;
replacing the adapted model with the target model;
determining the respective contrastive score for each data pair of a fourth dataset of data pairs using the base model and the replaced adapted model; and
training a subsequent target model using data pairs of the fourth dataset satisfying a threshold contrastive score.

21. The system of claim 13, wherein the first dataset comprises random data.

22. The system of claim 21, wherein the second dataset comprises data that is cleaner than the random data of the first dataset.

23. The system of claim 13, wherein the respective contrastive score comprises a Kullback—Leibler (KL) divergence.

24. The system of claim 13, wherein each dataset comprises sentence language pairs.

\* \* \* \* \*